US012767141B2

(12) United States Patent
Parks et al.

(10) Patent No.: US 12,767,141 B2
(45) Date of Patent: Oct. 20, 2026

(54) LANE CHANGE MANEUVER PLANNING FOR DRIVER IN CONTROL APPLICATION

(71) Applicant: GM GLOBAL TECHNOLOGY OPERATIONS LLC, Detroit, MI (US)

(72) Inventors: Jeffrey S. Parks, Ann Arbor, MI (US); Paul A. Adam, Milford, MI (US); Bryan M. Joyner, Clarkston, MI (US); Chase Goodin, Howell, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 95 days.

(21) Appl. No.: 18/829,007

(22) Filed: Sep. 9, 2024

(65) Prior Publication Data

US 2026/0070555 A1 Mar. 12, 2026

(51) Int. Cl.

| | |
|---|---|
| ***B60W 30/00*** | (2006.01) |
| ***B60W 10/18*** | (2012.01) |
| ***B60W 10/20*** | (2006.01) |
| ***B60W 30/16*** | (2020.01) |
| ***B60W 30/18*** | (2012.01) |
| ***B60W 50/08*** | (2020.01) |
| ***B60W 50/10*** | (2012.01) |

(52) U.S. Cl.

CPC ...... *B60W 30/18163* (2013.01); *B60W 10/18* (2013.01); *B60W 10/20* (2013.01); *B60W 30/16* (2013.01); *B60W 50/085* (2013.01); *B60W 50/10* (2013.01); *B60W 2554/802* (2020.02); *B60W 2720/10* (2013.01)

(58) Field of Classification Search

CPC ........... B60W 30/18163; B60W 30/16; B60W 10/18; B60W 10/20; B60W 50/085; B60W 50/10; B60W 2554/802; B60W 2720/10

See application file for complete search history.

(56) References Cited

U.S. PATENT DOCUMENTS

| | | | | |
|---|---|---|---|---|
| 11,993,308 B2 * | 5/2024 | Fujii | ...................... | G05D 1/247 |
| 2013/0085976 A1 * | 4/2013 | Bone | ............... | B60W 30/18163 706/46 |
| 2016/0001776 A1 * | 1/2016 | Kim | .................... | B60W 30/165 701/96 |

(Continued)

FOREIGN PATENT DOCUMENTS

| | | | | |
|---|---|---|---|---|
| CN | 117657143 A * | 3/2024 | ...... | B60W 30/18163 |
| DE | 102006043149 A1 | 3/2008 | | |

(Continued)

*Primary Examiner* — Amelia Vorce
*Assistant Examiner* — Brittany Renee Peko
(74) *Attorney, Agent, or Firm* — Ingrassia Fisher & Lorenz, LLP | IFL

(57) ABSTRACT

In accordance with exemplary embodiments, methods and systems are provided that include obtaining sensor data via one or more sensors of a vehicle; determining, via a processor of the vehicle using the sensor data, when a driver of the vehicle is initiating a lane change maneuver for the vehicle into an adjacent lane; determining, via the processor using the sensor data, a target zone for the lane change maneuver, the target zone including a region of the adjacent lane into which the vehicle would turn in executing the lane change maneuver; and controlling via the processor, longitudinal movement of the vehicle such that the vehicle can effectively execute the lane change maneuver into the adjacent lane.

20 Claims, 5 Drawing Sheets

(56) References Cited

U.S. PATENT DOCUMENTS

| | | | | |
|---|---|---|---|---|
| 2016/0200318 | A1* | 7/2016 | Parikh | B60W 30/143 701/96 |
| 2018/0170388 | A1* | 6/2018 | Shin | B60W 60/001 |
| 2020/0391746 | A1* | 12/2020 | Parks | B60W 60/00276 |
| 2022/0315003 | A1* | 10/2022 | Hong | B60W 30/18163 |

FOREIGN PATENT DOCUMENTS

| | | |
|---|---|---|
| DE | 102009033800 | 3/2010 |
| DE | 102014000843 | 8/2014 |
| DE | 102018221862 | 7/2020 |
| DE | 102020117159 | 12/2021 |
| DE | 102020117161 | 12/2021 |
| DE | 102022116267 | 1/2024 |

* cited by examiner

LANE CHANGE MANEUVER PLANNING FOR DRIVER IN CONTROL APPLICATION

INTRODUCTION

The technical field generally relates to platforms such as vehicles and, more specifically, to methods and systems for facilitating a lane change maneuver when initiated by a driver of the vehicle.

Many vehicles today have some form of automatic cruise control functionality. However, in certain situations, such techniques may not always be optimal, including for facilitating a lane change maneuver initiated by a driver of the vehicle.

Accordingly, it is desirable to provide improved methods and systems for facilitating lane change maneuvers for a vehicle when initiated by a driver of the vehicle.

SUMMARY

In accordance with an exemplary embodiment, a method is provided that includes obtaining sensor data via one or more sensors of a vehicle; determining, via a processor of the vehicle using the sensor data, when a driver of the vehicle is initiating a lane change maneuver for the vehicle into an adjacent lane; determining, via the processor using the sensor data, a target zone for the lane change maneuver, the target zone including a region of the adjacent lane into which the vehicle would turn in executing the lane change maneuver; and controlling via the processor, longitudinal movement of the vehicle such that the vehicle can effectively execute the lane change maneuver into the adjacent lane.

Also in an exemplary embodiment, the longitudinal movement of the vehicle is automatically controlled by the processor of the vehicle as the driver manually performs lateral movement of the vehicle via engagement of a steering wheel of the vehicle by the driver during the lane change maneuver.

Also in an exemplary embodiment, the step of determining the target zone includes determining, via the processor, the target zone from a plurality of target zone candidates of sufficient size to allow the vehicle to travel therethrough without contacting other vehicles or other objects.

Also in an exemplary embodiment, the method further includes determining, for each of the plurality of target zone candidates, whether the target zone candidate is of sufficient size based on a position and movement of the vehicle and the other vehicles or other objects as obtained via the sensor data, along with pre-calibrated requirements as to a driver-selected follow distance for adaptive cruise control with respect to those of the other vehicles and other objects that are in front of the vehicle as well as a buffer with respect to other of the other vehicles and other objects that are behind the vehicle.

Also in an exemplary embodiment, the target zone is selected via the processor such that the target zone includes a particular one of the plurality of target zone candidates that is closest to the vehicle in terms of a distance from the vehicle to the target zone, a time from the vehicle to the target zone, or both.

Also in an exemplary embodiment, the step of determining when the driver of the vehicle is initiating the lane change maneuver for the vehicle into the adjacent lane includes both obtaining, via the sensor data, a first indication of the lane change maneuver; and obtaining via the sensor data, a second indication of the lane change maneuver that is subsequent to the first indication; the step of determining the target zone includes determining, via the processor after the first indication and before the second indication, an initial target zone prediction from the plurality of target zone candidates for the lane change maneuver; and determining, via the processor after the second indication, an updated target zone prediction from the plurality of target zone candidates for the lane change maneuver; the step of controlling the longitudinal movement includes: controlling, via the processor, the longitudinal movement of the vehicle after the first indication and before the second indication by adjusting a longitudinal speed of the vehicle such that the vehicle is on path to effectively execute the lane change maneuver into the adjacent lane via the initial target zone prediction; and controlling, via the processor, the longitudinal movement of the vehicle after the second indication by adjusting the longitudinal speed of the vehicle such that the vehicle is on path to effectively execute the lane change maneuver into the adjacent lane via the updated target zone prediction.

Also in an exemplary embodiment, the first indication is based on the driver engaging a turn signal of the vehicle; and the first indication is made based on the driver engaging the steering wheel of the vehicle.

Also in an exemplary embodiment, the initial target zone prediction is made via the processor, after the first indication and before the second indication, to be an initial selection from the plurality of target zone candidates as a closest one of the plurality of target zone candidates to the vehicle in terms of a time for travel thereto by the vehicle; and the updated target zone prediction is made via the processor, after the first indication and before the second indication, to be an updated selection from the plurality of target zone candidates as a closest one of the plurality of target zone candidates to the vehicle in terms of a distance for travel thereto by the vehicle.

Also in an exemplary embodiment, the time for travel by the vehicle to a particular one of the plurality of target zone candidates is determined via the processor in connection with the following equation:

$$t_1 = \frac{-Vx1 + \sqrt{Vx1^2 - 2 * DclRate * \Delta x_1}}{DclRate},$$

in which "$t_1$" represents the time to reach a particular target zone candidate, "$V_{x1}$" represents a current velocity of a target vehicle or object at the particular target zone candidate; "DclRate" represents a calibratable parameter based on an expected longitudinal deceleration rate response of the for the lane change maneuver, "$\Delta x_1$" represents the distance the vehicle and the particular target zone candidate.

Also in an exemplary embodiment, the distance for travel by the vehicle to the particular one of the plurality of target zone candidates is determined via the processor based on a distance from a front of the vehicle to a rear edge of the particular target zone candidate, when the particular target zone candidate is behind the vehicle; and a distance from a rear of the vehicle to a front edge of the particular target zone candidate, when the particular target zone candidate is in front of the vehicle.

Also in an exemplary embodiment, the method further includes determining, via the processor using the sensor data; whether a trailer is attached to the vehicle; when it is determined that no trailer is attached to the vehicle, then determining, via the processor, the initial target zone prediction and the updated target zone prediction based on an entirety of the plurality of target zone candidates, regardless of whether the target zone candidates are in front of the vehicle or behind the vehicle; and when it is instead determined that a trailer is attached to the vehicle, then determining, via the processor, the initial target zone prediction and the updated target zone prediction instead based on only a subset of the plurality of target zone candidates that are in front of the vehicle.

In another exemplary embodiment, a system is provided that includes one or more sensors of a vehicle and a processor. The one or more sensors are configured to obtain sensor data, including as to engagement of a turn signal and a steering wheel of the vehicle by a driver of the vehicle. The processor is coupled to the one or more sensors, and is configured to at least facilitate determining, using the sensor data, when a driver of the vehicle is initiating a lane change maneuver for the vehicle into an adjacent lane, including a first indication of the lane change maneuver based on the engagement of the turn signal by the driver and a second indication of the lane change maneuver based on the engagement of the steering wheel by the driver; determining, using the sensor data, including as to the engagement of both the turn signal and the steering wheel by the driver, a target zone for the lane change maneuver, the target zone including a region of the adjacent lane into which the vehicle would turn in executing the lane change maneuver, and wherein the target zone is determined from a plurality of target zone candidates of sufficient size to allow the vehicle to travel therethrough without contacting other vehicles or other objects; and automatically controlling longitudinal movement of the vehicle as the driver manually performs lateral movement of the vehicle via engagement of the steering wheel of the vehicle by the driver during the lane change maneuver, such that the vehicle can effectively execute the lane change maneuver into the adjacent lane without contacting the other vehicles or other objects.

Also in an exemplary embodiment, the processor is further configured to at least facilitate determining, for each of the plurality of target zone candidates, whether the target zone candidate is of sufficient size based on a position and movement of the vehicle and the other vehicles or other objects as obtained via the sensor data, along with pre-calibrated requirements as to a driver-selected follow distance for adaptive cruise control with respect to those of the other vehicles and other objects that are in front of the vehicle as well as a buffer with respect to other of the other vehicles and other objects that are behind the vehicle.

Also in an exemplary embodiment, the processor is further configured to at least facilitate selecting the target zone such that the target zone includes a particular one of the plurality of target zone candidates that is closest to the vehicle in terms of a distance from the vehicle to the target zone, a time from the vehicle to the target zone, or both.

Also in an exemplary embodiment, the processor is further configured to at least facilitate determining, after the first indication and before the second indication, an initial target zone prediction from the plurality of target zone candidates for the lane change maneuver; determining, after the second indication, an updated target zone prediction from the plurality of target zone candidates for the lane change maneuver; controlling the longitudinal movement of the vehicle after the first indication and before the second indication by adjusting a longitudinal speed of the vehicle such that the vehicle is on path to effectively execute the lane change maneuver into the adjacent lane via the initial target zone prediction; and controlling the longitudinal movement of the vehicle after the second indication by adjusting the longitudinal speed of the vehicle such that the vehicle is on path to effectively execute the lane change maneuver into the adjacent lane via the updated target zone prediction.

Also in an exemplary embodiment, the processor is further configured to at least facilitate determining the initial target zone prediction after the first indication and before the second indication, to be an initial selection from the plurality of target zone candidates as a closest one of the plurality of target zone candidates to the vehicle in terms of a time for travel thereto by the vehicle; and determining the updated target zone prediction after the first indication and before the second indication, to be an updated selection from the plurality of target zone candidates as a closest one of the plurality of target zone candidates to the vehicle in terms of a distance for travel thereto by the vehicle.

Also in an exemplary embodiment, the processor is further configured to at least facilitate determining the time for travel by the vehicle to a particular one of the plurality of target zone candidates in connection with the following equation:

$$t_1 = \frac{-Vx1 + \sqrt{Vx1^2 - 2 * DclRate * \Delta x_1}}{DclRate},$$

in which "$t_1$" represents the time to reach a particular target zone candidate, "$V_{x1}$" represents a current velocity of a target vehicle or object at the particular target zone candidate; "DclRate" represents a calibratable parameter based on an expected longitudinal deceleration rate response of the for the lane change maneuver, "$\Delta x_1$" represents the distance the vehicle and the particular target zone candidate.

Also in an exemplary embodiment, the processor is further configured to at least facilitate determining the distance for travel by the vehicle to the particular one of the plurality of target zone candidates based on a distance from a front of the vehicle to a rear edge of the particular target zone candidate, when the particular target zone candidate is behind the vehicle; and a distance from a rear of the vehicle to a front edge of the particular target zone candidate, when the particular target zone candidate is in front of the vehicle.

Also in an exemplary embodiment, the processor is further configured to at least facilitate determining, using the sensor data, whether a trailer is attached to the vehicle; when it is determined that no trailer is attached to the vehicle, then determining the initial target zone prediction and the updated target zone prediction based on an entirety of the plurality of target zone candidates, regardless of whether the target zone candidates are in front of the vehicle or behind the vehicle; and when it is instead determined that a trailer is attached to the vehicle, then determining the initial target zone prediction and the updated target zone prediction instead based on only a subset of the plurality of target zone candidates that are in front of the vehicle.

In another exemplary embodiment, a vehicle is provided that includes a body, a drive system configured to move the body; a braking system configured to control braking for the body; a steering system configured to control steering for the body, the steering system including a steering wheel; and a control system including one or more sensors and a processor. The one or more sensors are configured to obtain sensor data, including as to engagement of the turn signal and the steering wheel by a driver of the vehicle. The processor is coupled to the one or more sensors, and is configured to at least facilitate: determining, using the sensor data, when a driver of the vehicle is initiating a lane change maneuver for the vehicle into an adjacent lane, including a first indication of the lane change maneuver based on the engagement of the turn signal by the driver and a second indication of the lane change maneuver based on the engagement of the steering wheel by the driver; determining, using the sensor data, a plurality of target zone candidates for the lane change maneuver, each of the plurality of target zone candidates including a region of the adjacent lane into which the vehicle would turn in executing the lane change maneuver wherein each of the plurality of target zone candidates of is sufficient size to allow the vehicle to travel therethrough without contacting other vehicles or other objects, and wherein the processor determines a selected target zone from the plurality of target zone candidates as follows: determining, using the sensor data, after the first indication of the lane change maneuver and before the second indication of the lane change maneuver, an initial target zone prediction for the selected target zone from the plurality of target zone candidates for the lane change maneuver as a closest one of the plurality of target zone candidates to the vehicle in terms of a time for travel thereto by the vehicle; determining, after the second indication of the lane change maneuver, an updated target zone prediction of the selected target zone from the plurality of target zone candidates for the lane change maneuver as a closest one of the plurality of target zone candidates to the vehicle in terms of a distance for travel thereto by the vehicle; automatically controlling longitudinal movement of the vehicle based initially on the initial target zone prediction and subsequently on the updated target zone prediction as the driver manually performs lateral movement of the vehicle via engagement of the steering wheel of the vehicle by the driver during the lane change maneuver, such that the vehicle can effectively execute the lane change maneuver into the adjacent lane without contacting the other vehicles or other objects, including based on whether the target zone candidate is of sufficient size based on a position and movement of the vehicle and the other vehicles or other objects as obtained via the sensor data, along with pre-calibrated requirements as to a driver-selected follow distance for adaptive cruise control with respect to those of the other vehicles and other objects that are in front of the vehicle as well as a buffer with respect to other of the other vehicles and other objects that are behind the vehicle, including by: controlling the longitudinal movement of the vehicle after the first indication of the lane change maneuver and before the second indication of the lane change maneuver by adjusting a longitudinal speed of the vehicle such that the vehicle is on path to effectively execute the lane change maneuver into the adjacent lane via the initial target zone prediction; and controlling the longitudinal movement of the vehicle after the second indication of the lane change maneuver by adjusting the longitudinal speed of the vehicle such that the vehicle is on path to effectively execute the lane change maneuver into the adjacent lane via the updated target zone prediction.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
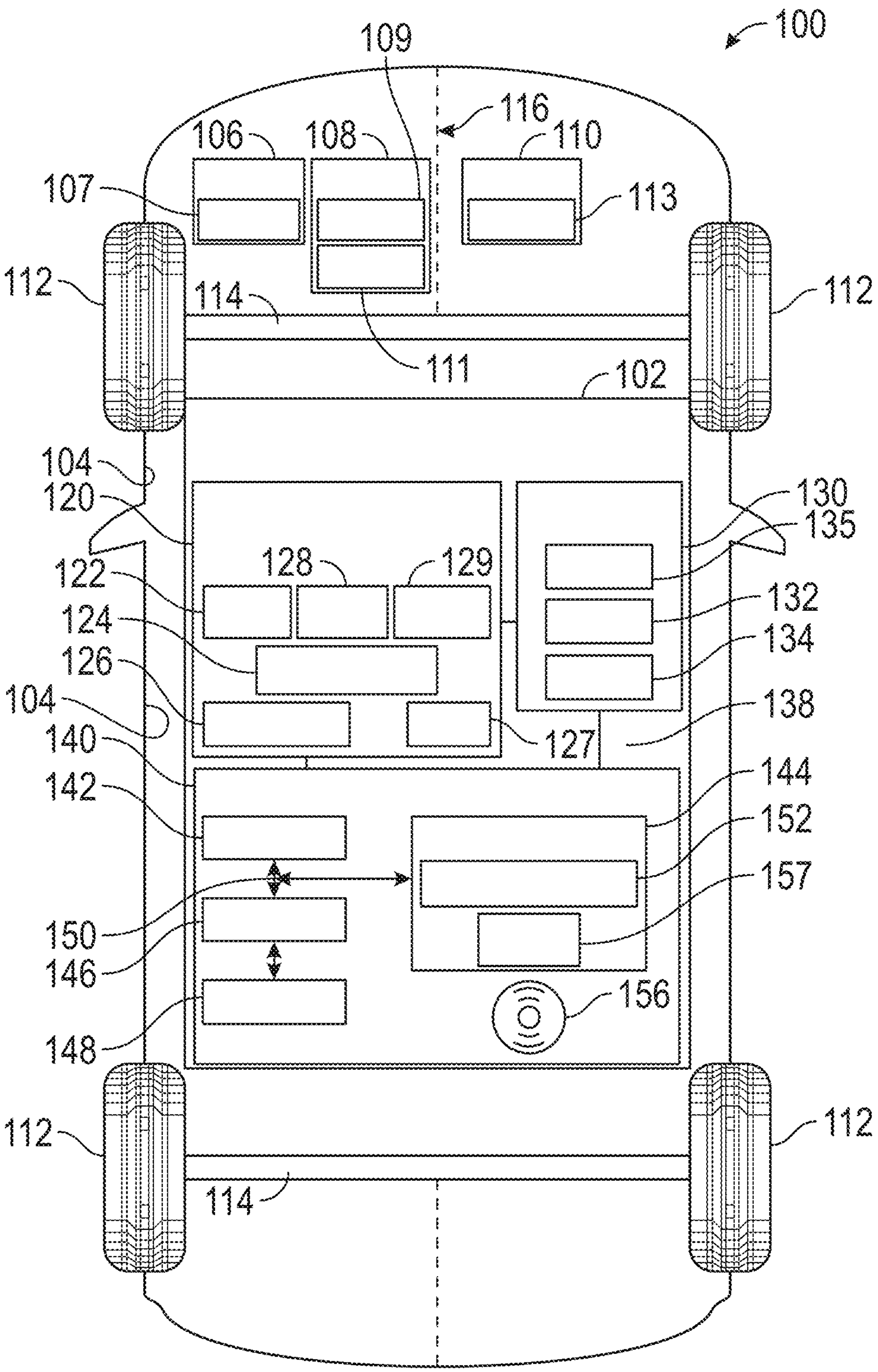
FIG. 1 is a functional block diagram of a vehicle that includes a control system for facilitating a lane change maneuver that is initiated by a driver of the vehicle, including by automatically controlling longitudinal movement of the vehicle in facilitating the lane change maneuver, in accordance with exemplary embodiments.

FIG. 1 illustrates a vehicle 100, according to an exemplary embodiment. As described in greater detail further below, the vehicle 100 includes, among other components, a control system 102 for facilitating a lane change maneuver that is initiated by a driver of the vehicle, in accordance with exemplary embodiments. As described in greater detail further below in connection with FIG. 1 as well as the process 200 of FIGS. 2 and 3 and the implementations of FIGS. 4 and 5, in various embodiments the control system 102 utilizes vehicle sensor data for automatically controlling longitudinal movement of the vehicle 100 in facilitating the lane change maneuver that has been initiated by a driver of the vehicle.

In accordance with an exemplary embodiment, the vehicle 100 may also be referred to as the "host vehicle" 100 in this Application. In addition, also in accordance with an exemplary embodiment, as the lane change maneuver is planned and performed, other vehicles or other objects that may be in proximity to the vehicle 100 (and which the control system 102 considers with respect to the lane change maneuver) may be referred to as "target vehicles", "other vehicles", "other objects", or the like in this Application.

In various embodiments, the vehicle 100 comprises an automobile, such as any one of a number of different types of automobiles, such as, for example, a sedan, a wagon, a truck, sport utility vehicle (SUV), or the like. In certain embodiments, the vehicle 100 may also comprise a motorcycle or other vehicle, such as aircraft, spacecraft, watercraft, and so on, and/or one or more other types of mobile platforms (e.g., a robot and/or another mobile platform).

In the depicted embodiment, the vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks, motorcycles, and certain other vehicles).

A drive system 110 is mounted on the chassis 116, and drives the wheels 112, for example via axles 114. In certain embodiments, the drive system 110 comprises a propulsion system having a motor 113 (e.g. that includes, in various embodiments, one or more combustion engines, electric motors, or the like).

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver (e.g., via a brake pedal 107) in certain situations, and in certain situations via a control system (including the control system 102).

Also in exemplary embodiments, the steering system 108 controls steering of the vehicle 100 via steering components that are controlled via inputs provided by a driver (e.g., via a steering wheel 109) in certain situations, and also in certain situations automatically via a control system (including the control system 102). In the depicted embodiment, the steering system 108 also includes or is coupled to a turn signal 111 that is engaged by a driver of the vehicle 100 to indicate when the driver intends to make a lane change or turn for the vehicle 100.

Figure 2:
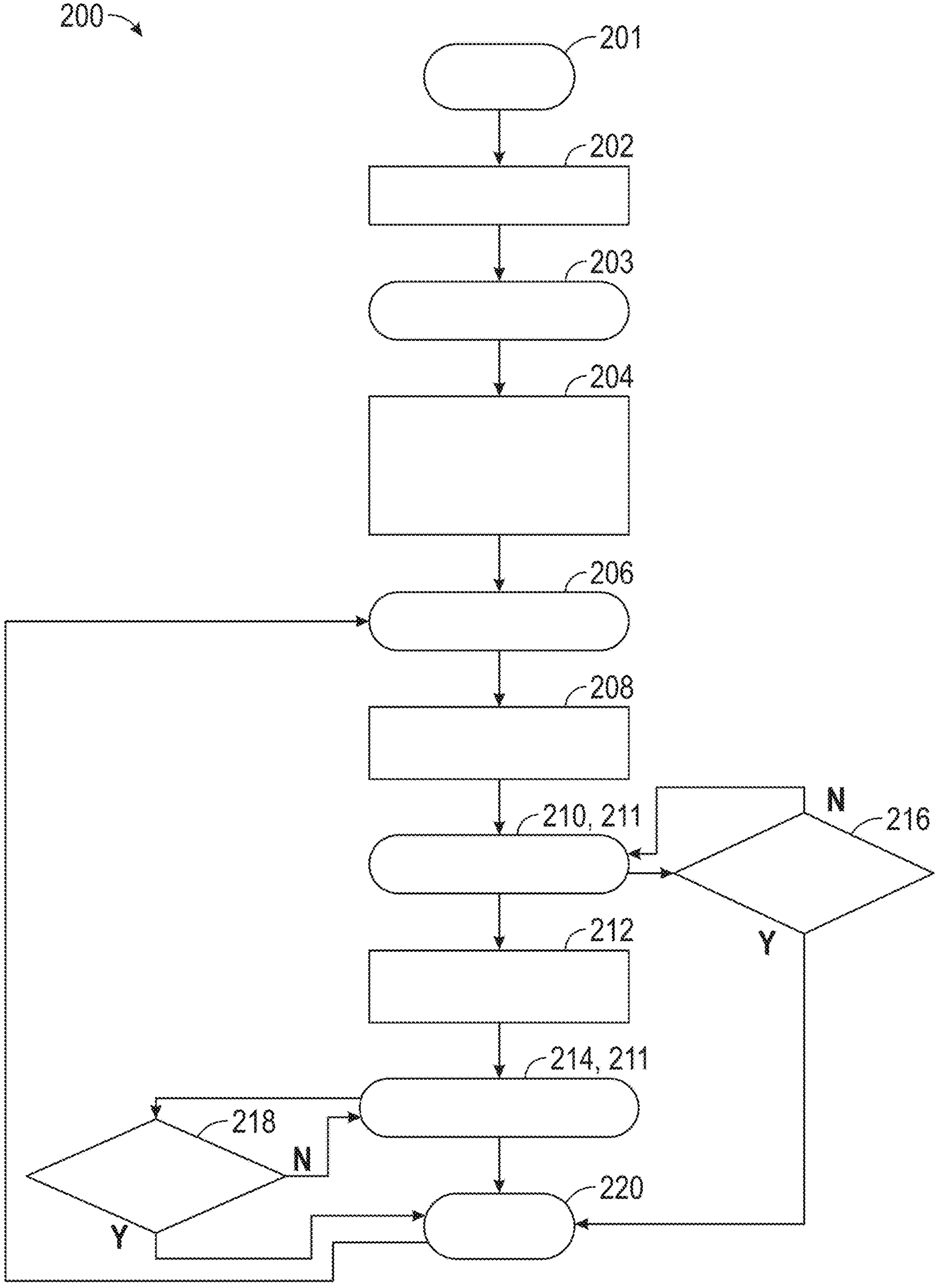
FIG. 2 is a flowchart of a process for facilitating a lane change maneuver that is initiated by a driver of the vehicle, including by automatically controlling longitudinal movement of the vehicle in facilitating the lane change maneuver, and that can be implemented in connection with the vehicle of FIG. 1, including the control system thereof, in accordance with an exemplary embodiment.
Figure 3:
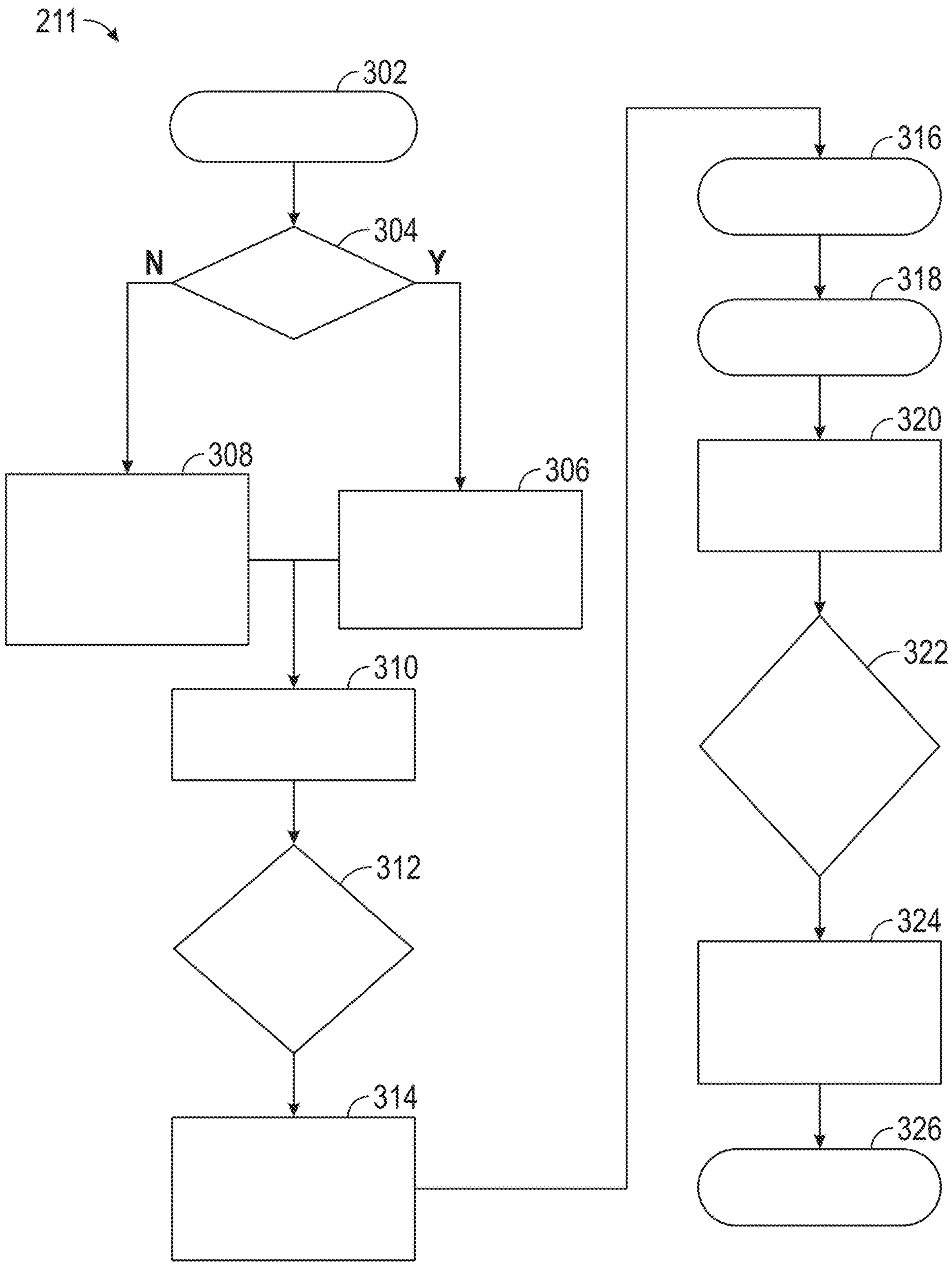
FIG. 3 is a flowchart of certain steps of the process of FIG. 2, including pre-lateral motion and lateral motion steps, in accordance with an exemplary embodiment.

In the embodiment depicted in FIG. 1, the control system 102 is coupled to the braking system 106, the steering system 108, and the drive system 110, and controls operation and functionality thereof. Also in various embodiments, the control system 102 provides for facilitating a lane change maneuver that is initiated by a driver of the vehicle 100, in accordance with the process 200 as depicted in FIGS. 2 and 3 and the implementations of FIGS. 4 and 5 and as described further below in connection therewith.

Also as depicted in FIG. 1, in various embodiments, the control system 102 includes a sensor array 120, a display 130, and a controller 140, as described in greater detail below.

In various embodiments, the sensor array 120 includes various sensors that obtain sensor data as to inputs that are used by the control system 102 for facilitating a lane change maneuver that is initiated by a driver of the vehicle 100, in exemplary embodiments. In the depicted embodiment, the sensor array 120 includes one or more steering sensors 122, radar sensors 124, cameras 126, speed sensors 127, and accelerometers 128. In certain embodiments, the sensor array 120 may further include one or more other sensors 129 (e.g., as to receiving other inputs, obtaining other detection data, and/or obtaining various operating parameters, environmental conditions, and the like).

In various embodiments, the steering sensors 122 detect the driver's engagement of the steering wheel 109 and turn signal 111, and including the driver's intent to steering the vehicle 100 (including in lane change maneuvers as described herein). In certain embodiments, certain of the steering sensors 122 detect the driver's engagement of the turn signal 111, whereas certain other of the steering sensors 122 detect the driver's engagement of the steering wheel 109. In certain embodiments, such steering sensors 122 may be part of, integrated with, and/or otherwise coupled to the turn signal 111 and the steering wheel 109, respectively.

In various embodiments, the radar sensors 124 detect other vehicles and/or other objects in proximity to the vehicle 100, including those that may affect a lane change maneuver as requested by the driver. In certain embodiments, the radar sensors 124 include both short range radar sensors and long range radar sensors.

Also in various embodiments, the cameras 126 are configured to obtain visual inputs as to a roadway on which the vehicle 100 is travelling, including other vehicles and other objects in proximity to the vehicle 100 and that may affect the lane changer maneuver initiated by the driver.

In various embodiments, the speed sensors 127 measure a speed of the vehicle 100. In certain embodiments, the speed sensors 127 comprise one or more wheel speed sensors that are part of or coupled to one or more of the wheels 112.

In various embodiments, the accelerometers 128 measure an acceleration of the vehicle 100.

In certain embodiments, the other sensors 129 of the sensor array 120 may include one or more input sensors (e.g., as to a desired lane change and/or one or more adaptive cruise control settings, and so on), one or more other types of detection sensors (e.g., as to one or more Lidar, sonar, and/or other detection sensors for detecting other vehicles and objects that may be in proximity to the vehicle 100, and/or for detecting whether a trailer is attached to the vehicle 100, and so on), and/or one or more other types of sensors for obtaining sensor data pertaining to various operating parameters, environmental conditions, and the like).

In various embodiments, each of the sensors of the sensor array 120 are disposed within or on the vehicle 100, such as on the body 104 and/or on or more other components thereof.

In various embodiments, the display 130 provides information for the driver, including as to the facilitating of a lane change maneuver by the control system 102 of the vehicle 100. As depicted in FIG. 1, in certain embodiments, the display 130 includes an audio component 132 (including one or more speakers) in addition to a visual (or video) component 134 (including one or more display screens) and one or more haptic components 135 (e.g., vibration of the driver seat or steering wheel, or the like).

In various embodiments, the controller 140 is coupled to the sensor array 120, in addition to the braking system 106, the steering system 108, the drive system 110, and the display 130. Also in various embodiments, the controller 140 receives sensor data from the sensor array 120, interprets and processes the sensor data, and provides instructions to the braking system 106 and the drive system 110 for automatically controlling longitudinal movement of the vehicle 100 for facilitating a lane change maneuver that is initiated by a driver of the vehicle 100 as determined using the sensor data. In certain embodiments, the controller 140 further provides instructions for the display 130 to provide notifications during or pertaining to such events.

In various embodiments, the controller 140 provides these functions in accordance with the steps of the process 200 that is depicted in FIGS. 2 and 3 and described in greater detail further below in connection therewith and further in connection with the implementations of FIGS. 4 and 5, also a described in greater detail further below.

As depicted in FIG. 1, in various embodiments, the controller 140 comprises a computer system (also referred to herein as computer system 140), and includes a processor 142, a memory 144, an interface 146, a storage device 148, and a computer bus 150.

The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit.

During operation, the processor 142 executes one or more programs 152 contained within the memory 144 and, as such, controls the general operation of the controller 140 and the computer system of the controller 140, generally in executing the processes described herein, such as the process 200 of FIGS. 2 and 3 and implementations of FIGS. 4 and 5 and as described further below in connection therewith.

The memory 144 can be any type of suitable memory, including various types of non-transitory computer readable storage medium. In certain examples, the memory 144 is located on and/or co-located on the same computer chip as the processor 142. In the depicted embodiment, the memory 144 stores the above-referenced program 152 along with stored values 157 (e.g., look-up tables, thresholds, and/or other values with respect to the process 200).

The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 of FIGS. 2 and 3 and implementations of FIGS. 4 and 5 and as described further below in connection therewith. In another exemplary embodiment, the program product may be directly stored in and/or otherwise accessed by the memory 144 and/or a disk (e.g., disk 156), such as that referenced below.

The bus 150 serves to transmit programs, data, status and other information or signals between the various components of the computer system of the controller 140. The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program.

FIG. 2 is a flowchart of a process 200 for facilitating a lane change maneuver that is initiated by a driver of a vehicle, in accordance with an exemplary embodiment. In various embodiments, the process 200 automatically controls longitudinal movement (e.g., including longitudinal velocity and acceleration) of the vehicle 100 to facilitate the lane change maneuver after initiation by the driver (while the driver controls lateral steering of the vehicle 100, in an embodiment). Also in various embodiments, the process 200 can be implemented in connection with the vehicle 100 of FIG. 1, including the control system 102 thereof. The process 200 will also be described further below in connection with FIG. 3 (which depicts an exemplary embodiment of certain steps of the process 200, namely, pertaining to pre-lateral motion and lateral motion for the vehicle 100), along with FIGS. 4 and 5 (which depict exemplary implementations of the process 200).

As depicted in FIG. 2, in various embodiments the process 200 begins at 202. In certain embodiments, the process 200 begins when the vehicle 100 is being driven by a driver during a current vehicle drive. In various embodiments, the steps of the process 200 continue, preferably continuously, throughout the duration of the vehicle drive.

In various embodiments, sensor data is obtained (step 202). Specifically, in certain embodiments, sensor data is obtained from each of the sensors of the sensor array 120 of FIG. 1, including as to user inputs from a driver of the vehicle 100 as to steering of the vehicle 100 along with any initiation or indication of a lane change via the steering wheel 109 and/or turn signal 111 (e.g., via the steering sensors 122), in addition to operating parameters of the vehicle 100 including a velocity and acceleration thereof (via speed sensors 127 and accelerometers 128, respectively), along with detection and information pertaining to one or more other vehicles or other objects in proximity to the vehicle 100 (via the radar sensors 124 and/or cameras 126), in addition om certain embodiments to information as to traffic and conditions of the roadway, and so on.

In various embodiments, as the process 200 begins, the vehicle 100 begins in a disabled state (step 203). In certain embodiments, during this state, automated cruise control and automated lane centering functionality are both disabled.

In various embodiments, conditions for the process 200 are enabled when automated adaptive cruise control for the vehicle 100 is enabled while automated lane centering control for the vehicle 100 is disabled (step 204). Accordingly, in an exemplary embodiment, during this condition, the driver maintains steering control (including for lateral control such as lane changes), whereas the controller 140 of FIG. 1 (including the processor 142 thereof) maintains longitudinal control (including for accelerating and decelerating for the vehicle 100). In various embodiments, this condition is recognized by the processor 142 via the sensor data (e.g., as obtained from one or more input sensors of the other sensors 129 of the sensor array).

In various embodiments, the vehicle 100 remains in an inactive state (step 206) until the driver provides an intention of making a lane change or an initiation of a lane change. Specifically, in various embodiments, during this state, the processor 142 controls longitudinal movement of the vehicle 100 without regard to any lane changes. Also in certain embodiments, during this stage, the processor 142 maintains a predetermined distance or time behind one or more target vehicles that may be in front of the vehicle 100 and/or maintains a constant longitudinal speed for the vehicle 100, depending on the circumstances.

In various embodiments, an initial lane change detection is made (step 208). Specifically, in certain embodiments, a detection is made by one or more steering sensors 122 of FIG. 1 that the driver has engaged the turn signal 111 of FIG. 1, and/or the processor 142 makes this determination based on the sensor data.

In various embodiments, an initial lane change detection is made (step 208). Specifically, in certain embodiments, a detection is made by one or more steering sensors 122 of FIG. 1 that the driver has engaged the turn signal 111 of FIG. 1, and/or the processor 142 makes this determination based on the sensor data.

Also in various embodiments, pre-lateral motion actions are taken (step 210). Specifically, in various embodiments, the processor 142 makes various determinations and appropriate actions as to longitudinal movement of the vehicle 100 during step 210 based on (and following) the turn indication provided by the driver, including a determination of one or more likely windows for turning into the desired lane, a determination as to longitudinal speed and acceleration required to meet the one or more likely windows, and execution of longitudinal movement of the vehicle 100 to meets these ends. The pre-lateral motion actions of step 210 are described in greater further below in connection with FIG. 3 in accordance with an exemplary embodiment.

In various embodiments, a subsequent lane change detection is made (step 212), namely of a second indication of the lane change maneuver as provided by the driver. Specifically, in certain embodiments, a detection is made by one or more steering sensors 122 of FIG. 1 that the driver has engaged the steering wheel 109 of FIG. 1 in the same direction as the turn signal, and by at least a predetermined number of degrees in rotation (that can be calibrated in various embodiments and stored in the memory 144 of FIG. 1 as one of the stored values 157 therein).

Also in various embodiments, lateral motion actions are taken (step 214). Specifically, in various embodiments, the processor 142 makes various determinations and appropriate actions as to longitudinal movement of the vehicle 100 during step 214 based on (and following) the driver's engagement of the steering wheel 109, including a determination of one or more likely windows for turning into the desired lane, a determination as to longitudinal speed and acceleration required to meet the one or more likely windows, and execution of longitudinal movement of the vehicle 100 to meets these ends. The lateral motion actions of step 214 are described in greater further below in connection with FIG. 4 in accordance with an exemplary embodiment.

In accordance with an exemplary embodiment, the pre-lateral motion actions of step 210 and the lateral motion actions of step 214 are collectively also referred to as combined actions 211 in FIG. 2, and these combined actions 211 will (as alluded to above) be described in greater detail further below in connection with FIG. 3 in accordance with an exemplary embodiment.

With further reference to FIG. 2, in various embodiments determinations are also made during the pre-lateral motion stage control 210 as to whether any abort conditions are satisfied (step 216). Specifically, in various embodiments, during step 216, the processor 142 determines whether any abort conditions are satisfied that would lead to aborting the lane change. In certain embodiments, the abort conditions of step 216 include the following: (1) a time searching for an acceptable window for turning into the desired lane has exceeded a predetermined value; or (2) the driver turns off the turn signal 111.

In various embodiments, when one or more such abort conditions are determined in step 216, then in various embodiments the lane change is aborted (step 220). In various embodiments, during step 220, the processor 142 provides one or more notifications for the driver via the display 130 of FIG. 1 (e.g., including one or more audio, visual, and/or haptic warnings) for the driver to terminate the desired lane change and to instead stay in the vehicle's current lane. Also in certain embodiments, the processor 142 also reverts to a default longitudinal control, such as in step 206 described above (i.e., in which a lane change is not occurring).

Conversely, if no abort conditions are determined in step 216, then in various embodiments the process 200 maintains in step 210 with the pre-lateral motion control.

Also in various embodiments, determinations are also made during the lateral motion stage control 214 as to whether any abort conditions are satisfied (step 218). Specifically, in various embodiments, during step 218, the processor 142 determines whether any abort conditions are satisfied during this stage that would lead to aborting the lane change. In certain embodiments, the abort conditions of step 220 include the following: (1) a time moving (e.g., while in the lateral motion stage) has exceeded a predetermined threshold value; (2) a distance from the host vehicle 100 to a center of the target lane (in which the host vehicle 100 was intended to turn) is less than a predetermined threshold value; or (3) a forward target (i.e., in front of the host vehicle 100 in the direction in which the host vehicle 100 is travelling) is selected as the closest in path.

In various embodiments, when one or more such abort conditions are determined in step 218, then in various embodiments the process 200 proceeds to the above-referenced step 220, in which the lane change is aborted and the process then returns to step 210.

Conversely, if no abort conditions are determined in step 218, then in various embodiments the process 200 maintains in step 214 with the lateral motion control.

With reference now to FIG. 3, a flowchart is provided, in accordance with an exemplary embodiment, for the combined actions 211 of FIG. 2, including both the pre-lateral motion stage control 210 and the lateral motion stage control 214 stages of FIG. 2.

The combined actions 211 of FIGS. 2 and 3 are also described below in connection with FIGS. 4 and 5, which depict exemplary implementations of the process 200, including the pre-lateral motion stage control 210 and the lateral motion stage control 214.

As depicted in FIG. 3, in an exemplary embodiment, the vehicle 100 enters pre-lateral motion mode (step 302). In certain embodiments, this occurs when (or after) the driver provides a first indication of a lane change maneuver (i.e., by engaging the turn signal 111 of the vehicle 100, for example as set forth in step 208 of FIG. 2) and before the driver provides a second indication of the lane change maneuver (i.e., by engaging the steering wheel 109 of the vehicle 100 in making the lane change).

In certain embodiments, a determination is made as to whether a trailer is attached to the vehicle 100 (step 304). In certain embodiments, this is determined via the processor 142 of FIG. 1 based on sensor data (e.g., from one or more cameras 126, radar sensors 124, and/or other sensors 129 of the sensor array 120 of FIG. 1, such as a sensor associated with an integrated brake controller for the trailer, and so on).

In certain embodiments, if it is determined that a trailer is attached to the vehicle 100, then the processor proceeds to step 306, in which the processor 142 finds all target zones (also referred to herein as target zone candidates) in front of the host vehicle 100 that are large enough for the host vehicle 100 to enter with respect to the lane change. Conversely, if it is instead determined that no trailer is attached to the vehicle 100, then the processor proceeds instead to step 308, in which the processor 142 finds all target zones (also referred to herein as target zone candidates) in front of and behind the host vehicle 100 that are large enough for the host vehicle 100 to enter with respect to the lane change. In certain embodiments (e.g., in which the vehicle 100 is not equipped to haul a trailer), then the determination of step 304 may not be necessary, and the process 200 may automatically proceed to step 308 once the pre-lateral motion mode is entered in step 302.

As used throughout this Application, the term "target zone" refers to a region of an adjacent lane into which the vehicle 10 would turn in executing the lane change maneuver without contacting any other vehicles or other objects, including those in the adjacent lane and further including any other vehicles or other objects, such that the vehicle 100 can effectively maneuver into the adjacent lane. Also as used herein, "target zone candidates" refer to a plurality of different target zones which the vehicle 100 may utilize in executing the lane change maneuver.

In various embodiments, in any of these scenarios of steps 304-308, the process 200 then proceeds to step 310, as the time to zone is calculated for each of the identified target zones (or target zone candidates) of steps 306 or 308, as described in greater detail further below.

Figure 4:
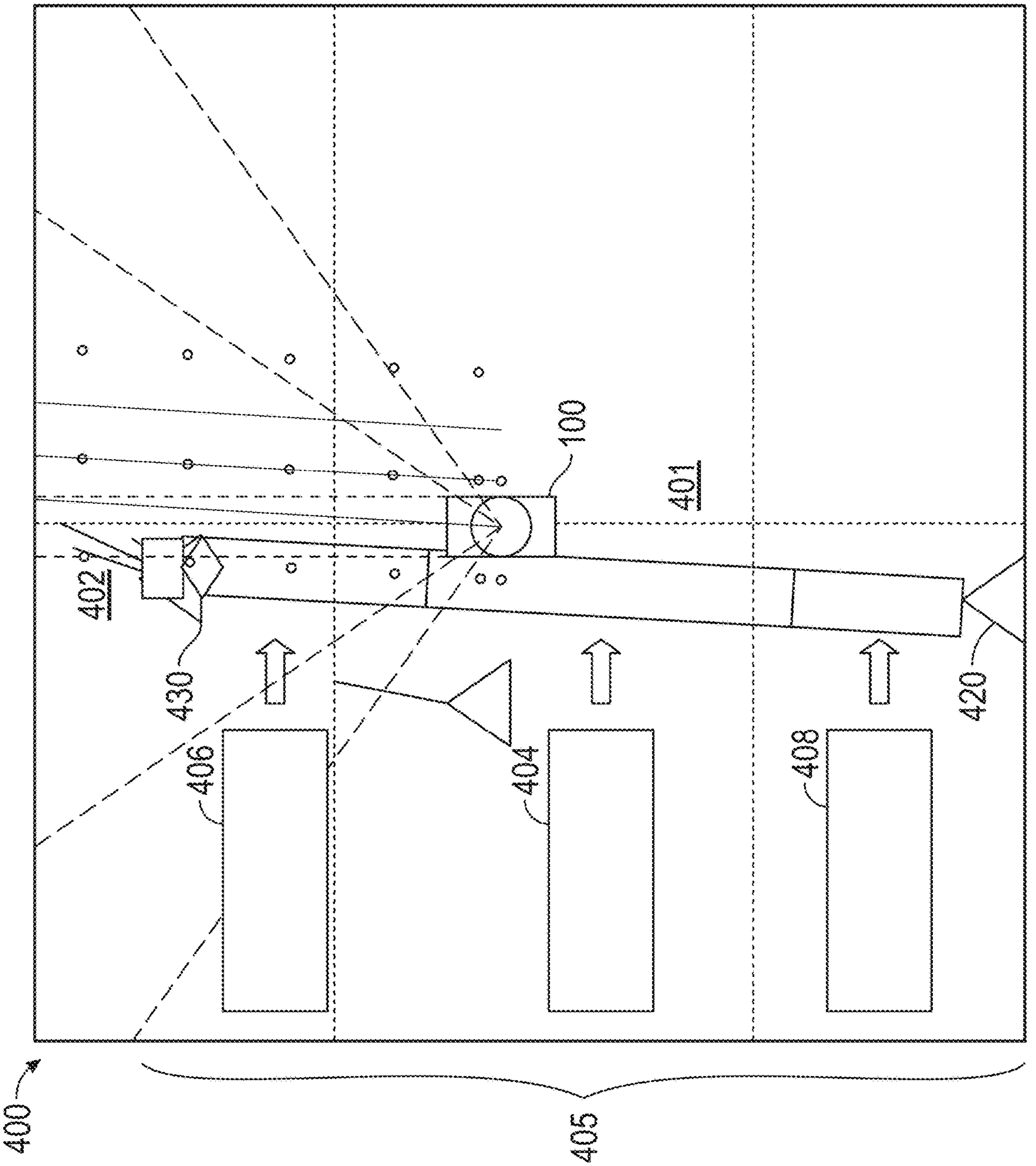
FIGS. 4 and 5 depict exemplary illustrations of implementations of the process of FIGS. 2 and 3, in accordance with an exemplary embodiment, including (i) a first illustration in FIG. 4 in accordance with a first implementation in which the vehicle is turning into an adjacent left lane; and (ii) a second illustration in FIG. 5 implementation in which the vehicle is turning into an adjacent right lane.
Figure 5:
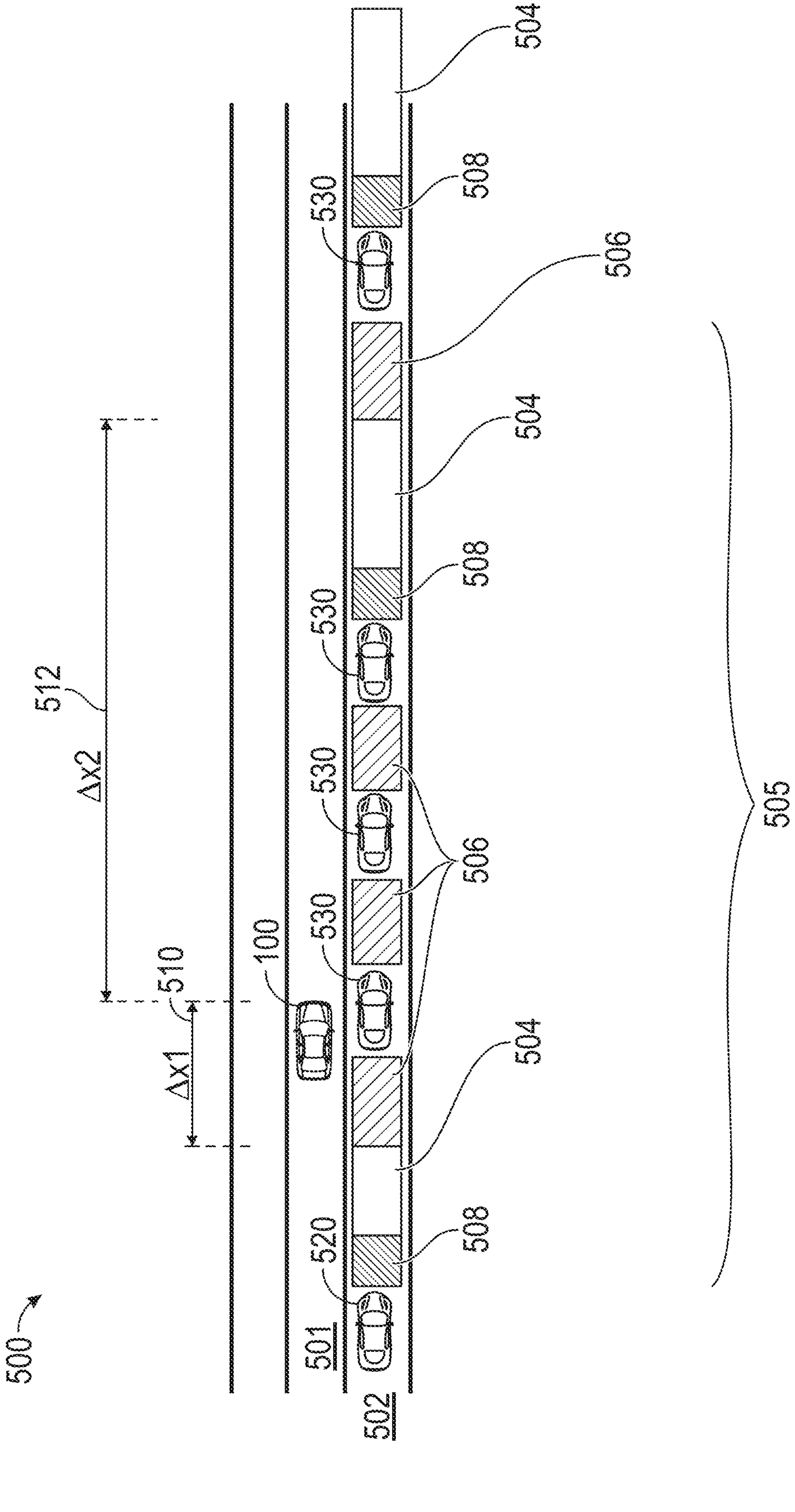

With reference now to FIGS. 4 and 5, illustrations are provided with respect to exemplary target zones, in accordance with exemplary embodiments of implementations of the process 200.

First, as depicted in FIG. 4, an illustration 400 is provided in accordance with a first implementation of the process 200, in which the vehicle 100 is turning into an adjacent left lane. As depicted in FIG. 4 in accordance with an exemplary embodiment, the vehicle 100 is currently in a host vehicle lane 401, and the driver is intending to maneuver the vehicle 100 into an adjacent lane 402 that is to the left of the vehicle 100. In an exemplary embodiment, one or more rear target vehicles (or objects) 420 (i.e., behind the host vehicle 100) and one or more front target vehicles (or objects) 430 (i.e., in front of the host vehicle 100) are identified by the processor 142 based on the sensor data (e.g., from the cameras 126 and/or radar sensors 124). Also in certain embodiments, the rear target vehicles (or objects) 420 and front target vehicles (or objects) 430 are disposed in the adjacent lane 402 into which the host vehicle 100 is to turn.

With continued reference to FIG. 4, in various embodiments, a number of potential target zones 405 (also referred to herein as target zone candidates) are identified by the processor 142 using the sensor data, including based on the sensor data from the cameras 126 and/or radar sensors 124 in combination with additional sensor data as to a heading and movement of the host vehicle 100 (e.g., via the speed sensors 127, the accelerometers 128, steering sensors 122, and the like).

As depicted FIG. 4 in accordance with an exemplary embodiment, certain of the target zones 405 are sufficiently large such as to allow the host vehicle 100 to change lanes into the adjacent lane 402. In FIG. 4, these are denoted as permissible target zones 404 (also referred to herein as target zone candidates), in which lane changes may be effectively made into the adjacent lane 402.

Also as depicted FIG. 4 in accordance with an exemplary embodiment, a buffer 408 is also identified with respect to rear vehicles (or objects) 420 behind the vehicle 100. In various embodiments, the buffer 408 may be required so that the permissible target zones 404 provide enough room for the host vehicle 100 to effectively change lanes while successfully avoiding the rear vehicles (or objects) 420.

Also as depicted FIG. 4 in accordance with an exemplary embodiment, a follow distance 406 is also identified with respect to the front target vehicle (or object) 430. In various embodiments, the follow distance 406 may be pre-selected by the driver for adaptive cruise control. Also in various embodiments, the follow distance 406 may also be required so that the permissible target zones 404 provide enough room for the host vehicle 100 to effectively change lanes while successfully avoiding the front target vehicle (or object) 430.

Next, as depicted in FIG. 5, an illustration 500 is provided in accordance with a second implementation of the process 200, in which the vehicle 100 is turning into an adjacent right lane. As depicted in FIG. 5 in accordance with an exemplary embodiment, the vehicle 100 is currently in a host vehicle lane 501, and the driver is intending to maneuver the vehicle 100 into an adjacent lane 502 that is to the right of the vehicle 100. In an exemplary embodiment, one or more rear target vehicles (or objects) 520 (i.e., behind the host vehicle 100) and one or more front target vehicles (or objects) 530 (i.e., in front of the host vehicle 100) are identified by the processor 142 based on the sensor data (e.g., from the cameras 126 and/or radar sensors 124). Also in certain embodiments, the rear target vehicles (or objects) 520 and front target vehicles (or objects) 530 are disposed in the adjacent lane 502 into which the host vehicle 100 is to turn.

With continued reference to FIG. 5, in various embodiments, a number of potential target zones 505 (also referred to herein as target zone candidates) are identified by the processor 142 using the sensor data, including based on the sensor data from the cameras 126 and/or radar sensors 124 in combination with additional sensor data as to a heading and movement of the host vehicle 100 (e.g., via the speed sensors 127, the accelerometers 128, steering sensors 122, and the like).

As depicted FIG. 5 in accordance with an exemplary embodiment, certain of the target zones 505 are sufficiently large such as to allow the host vehicle 100 to change lanes into the adjacent lane 502. In FIG. 5, these are denoted as permissible target zones 504 (also referred to herein as target zone candidates), in which lane changes may be effectively made into the adjacent lane 502.

Also as depicted FIG. 5 in accordance with an exemplary embodiment, a buffer 508 is also identified with respect to the rear target vehicle (or object) 520. In various embodiments, the buffer 508 may be required so that the permissible target zones 504 provide enough room for the host vehicle 100 to effectively change lanes while successfully avoiding the rear target vehicle (or object) 520.

Also as depicted FIG. 5 in accordance with an exemplary embodiment, a follow distance 506 is also identified with respect to the front target vehicle (or object) 530. In various embodiments, the follow distance 506 may be pre-selected by the driver. Also in various embodiments, the follow distance 506 may also be required so that the permissible target zones 504 provide enough room for the host vehicle 100 to effectively change lanes while successfully avoiding the front target vehicle (or object) 530.

With reference back to FIG. 3, as noted above, during step 310, the time to zone is calculated for each of the identified zones (or target zone candidates) of steps 306 or 308. In various embodiments, the time to zone represents an estimated amount of time in which the vehicle 100 is expected to reach of the identified target zones, including the target zones 405 of FIG. 4 and the target zones 505 of FIG. 5 (and particularly for use in determining the target zones 404, 504 that represent permissible target zones for the host vehicle 100 to maneuver into the desired lane).

In various embodiments, during step 310, the processor 142 calculates the time to zone for each of the target zones (or target zone candidates) in accordance with the following equations:

$$t_1 = \frac{-Vx1 + \sqrt{Vx1^2 - 2 * DclRate * \Delta x_1}}{DclRate}, \quad \text{(Equation 1)}$$

in which:

$$t2a = \frac{-Vx2}{DclRate}, \quad \text{(Equation 2)}$$

$$X_{2a} = -\frac{DclRate}{2} * (t2a)^2 - Vx2 * t2a, \quad \text{(Equation 3)}$$

and $$t2 = t2a + \frac{(\Delta x_2 - x2a)}{-Vx}, \quad \text{(Equation 4)}$$

and in which:

- "1", "2", . . . represent different target zones for entering the new lane, wherein target zone "1" represents a first target zone, "2" represents a second target zone, and so on;
- "t" represents the time needed for the host vehicle 100 to reach a particular target zone, such that "$t_1$" represents the time to reach a first target zone (or a particular target zone candidate) from the current position of the vehicle 100, "$t_2$" represents a time to reach a second target zone from the current position of the vehicle 100, "$t_{2a}$" represents the time it takes for the host vehicle 100 to travel between different target zones, and so on;
- "V" represents a current velocity of a target vehicle (or object) at a particular zone (e.g., such that "$V_{x1}$" represents a current velocity of a target vehicle or object at a particular target zone candidate, in an exemplary embodiment); and
- "DclRate" represents a calibratable parameter based on an expected longitudinal deceleration rate response of the host vehicle 100 to the process 200 in executing the lane change maneuver; and
- "x" represents a position of a particular target zone, such that "$x_1$" represents a position of a first target zone, "$x_2$" represents a position of a second target zone, "$\Delta x_1$" represents a distance between the host vehicle 100 and the first target zone (e.g., a particular target zone candidate in an exemplary embodiment), "$\Delta x_2$" represents a distance between the host vehicle 100 and the second target zone, and so on.

In an exemplary embodiment, the above equations calculate the time it will take for the host to realign with the target zone. Specifically, in accordance with an exemplary embodiment, $T_2$ includes two components, namely $T_{2a}$ and $T_{2b}$. Also in an exemplary embodiment: $T_{2a}$ is the time to decelerate to match the vehicles that define this zone; $X_{2a}$ is the distance covered during the deceleration period; and $T_{2b}$ is the time traveling before the deceleration while covering the distance between the host vehicle and the zone.

For example, in one example using specific non-limiting values for illustrative purposes only:

$$DclRate = 0.2 \text{ m/s/s};$$

$$V_{x2} = -2 \text{ m/s};$$

$$\Delta x_2 = 50;$$

$$T_{2a} = 2/0.2 = 10;$$

$$X_{2a} = 0.2/2 * 10 * 10 + 0.2 * 10 = 30;$$

and $$T_2 = 10 + (50 - 30)/2 = 20.$$

In this non-limiting illustration, the result of these equations in this particular example would mean that the host vehicle 100 will cover the first twenty meters (20 m) of distance (in ten seconds) between the host vehicle 100's current position and final position before the host vehicle 100 begins to decelerate. Also in this example, the host vehicle 100 will then decelerate for the final thirty meters (30 m) of distance while covering thirty meters (30 m).

As illustrated in FIG. 5, in an exemplary embodiment, when a particular target zone 504 is located behind the host vehicle 100, then in various embodiments the distance between the host vehicle 100 and the target zone 504 is measured between a front of the host vehicle 100 and a front edge of the target zone (e.g., as represented by the value $\Delta x_1$ 510 as denoted in FIG. 5). Also as illustrated in FIG. 5, in an exemplary embodiment, when a particular target zone 504 is located in front of the host vehicle 100, then in various embodiments the distance between the host vehicle 100 and the target zone 504 is also measured between a front end of the host vehicle 100 and a front edge of the target zone (e.g., as represented by the value $\Delta x_2$ 512 as denoted in FIG. 5) (e.g., so that the host vehicle 100 slows down to match its speed with that of the forward vehicle in accordance with an exemplary embodiment).

With reference back to FIG. 3, in various embodiments an initial target selection is made (step 312). Specifically, in an exemplary embodiments, during step 312 (after the driver has engaged the turn signal 111 and before the driver has engaged the steering wheel 109, in an exemplary embodiment), the processor 142 makes an initial selection of a particular target zone out of the potential target zone candidates of sufficient size to allow the host vehicle 100 to transfer lanes (e.g., one of the permissible target zones 404 of FIG. 4 and/or permissible target zones 504 of FIG. 5), such that particular selected target zone (also referred to herein as an "initial target zone prediction") is the permissible target zone that is closest to the host vehicle 100 in terms of travel time (i.e., having the smallest time to zone for the host vehicle 100).

In various embodiments, the host vehicle 100 is commanded toward the selected target zone (step 314). Specifically, in various embodiments, the processor 142 controls longitudinal movement of the vehicle 100 to align with the selected target zone of step 312 (i.e., the initial target zone prediction), such that the vehicle 100 will be ready to maneuver into the desired lane (and avoid any detected target vehicles and other objects) when the vehicle 100 reaches the selected target zone. In various embodiments, the processor 142 provides control signals to the braking system 106, the drive system 110, or both, of FIG. 1 to automatically control the longitudinal movement (including longitudinal velocity and acceleration) of the host vehicle 100 in this manner in preparation of the lane change maneuver. Also in an exemplary embodiment, during this action, a longitudinal speed of the vehicle 100 is automatically adjusted via instructions provided by the processor 142 to the braking system 106 and/or the drive system 110 such that the vehicle 100 is on path to effectively execute the lane change maneuver into the adjacent lane via the initial target zone prediction.

Also in various embodiments, the process 200 then waits until the lateral motion zone (step 316). Specifically, in various embodiments, during step 316, the processor 142 continues controlling the longitudinal control in this manner until the driver begins making the lane change (i.e., in an exemplary embodiment, until the driver engages the steering wheel 109 in the same direction as the turn signal and at least by a predetermined magnitude of rotational movement).

In various embodiments, once the driver has provided the second indication of the lane change maneuver (i.e., by engaging the steering wheel 109 in the same direction as the turn signal and at least by a predetermined magnitude of rotational movement in an exemplary embodiment), then the process 200 enters the lateral motion mode (step 318).

In various embodiments, once the process 200 enters the lateral motion mode, then an indication is made as to all target zone candidates that are large enough for the host vehicle to enter (step 320). Specifically, in an exemplary embodiment, during step 320, the processor 142 identifies, in view of the current sensor data and information (e.g., including the current position, heading, velocity, and acceleration of the host vehicle 100 as well as target vehicles and other objects, in various embodiments), identifies all potential target zone candidates in proximity to the host vehicle 100 that would allow the host vehicle 100 to successfully complete the intended maneuver into the adjacent lane.

Also in various embodiments, an updated target zone selection is made (step 322). Specifically, in an exemplary embodiments, during step 312 (after the driver has engaged the steering wheel 109, in an exemplary embodiment), the processor 142 makes an updated selection of a particular target zone out of the potential target zone candidates of sufficient size of step 320 to allow the host vehicle 100 to transfer lanes (e.g., one of the permissible target zones 404 of FIG. 4 and/or permissible target zones 504 of FIG. 5), such that particular selected target zone (also referred to herein as an "updated target zone prediction") is the permissible target zone that is closest to the host vehicle 100 in terms of distance (i.e., having the smallest distance to zone for the host vehicle 100).

Accordingly, while the selection of the particular target zone of step 312 (i.e., the initial target zone prediction) during the pre-lateral motion mode (i.e., after the driver engaged the turn signal 111 but before the driver engaged the steering wheel 109) was made based on the shortest distance to the host vehicle 100, the selection of the particular target zone of step of 322 (i.e., the updated target zone prediction) during the lateral target zone (i.e., after the driver has engaged the steering wheel 109) is now based on the shortest distance to the host vehicle 100.

In various embodiments, the host vehicle 100 is commanded toward the selected target zone (step 324). Specifically, in various embodiments, the processor 142 controls longitudinal movement of the vehicle 100 to align with the selected target zone of step 322 (i.e., the updated target zone prediction), such that the vehicle 100 will be ready to maneuver into the desired lane (and avoid any detected target vehicles and other objects) when the vehicle 100 reaches the selected target zone. In various embodiments, the processor 142 provides control signals to the braking system 106, the drive system 110, or both, of FIG. 1 to automatically control the longitudinal movement (including longitudinal velocity and acceleration) of the host vehicle 100 in this manner such that the vehicle is on path to effectively execute the lane change maneuver into the adjacent lane via the updated target zone prediction as the lane change maneuver is implemented (i.e., as the driver manually controls lateral movement of the vehicle 100 via engagement of the steering wheel 109).

In various embodiments, the process then terminates (step 326).

Accordingly, methods, systems, and vehicles are provided for automatically facilitating a lane change maneuver upon initiation by a driver of the vehicle, based on various conditions, parameters, and determinations are described in greater detail above and in the Figures. In various embodiments, automatic control of longitudinal movement of the vehicle 100 is controlled via a processor of the vehicle, using sensor data of sensors of the vehicle, in order to facilitate movement of the vehicle 100 into an appropriate window for turning into an adjacent lane in accordance with the lane change that is initiated by the driver.

It will be appreciated that the systems, vehicles, and methods may vary from those depicted in the Figures and described herein. For example, the vehicle 100 of FIG. 1, including the control system 102 and/or other components thereof, may vary in different embodiments from that depicted in FIG. 1 and/or described above in connection therewith. It will similarly be appreciated that the steps of the process 200 and implementations thereof may differ from those depicted in FIGS. 2-5, and/or that various steps of the process 200 may occur concurrently and/or in a different order than that depicted in FIGS. 2-5 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:

obtaining sensor data via one or more sensors of a vehicle;

determining, via a processor of the vehicle using the sensor data, when a driver of the vehicle is initiating a lane change maneuver for the vehicle into an adjacent lane;

determining, via the processor using the sensor data, a target zone for the lane change maneuver, the target zone comprising a region of the adjacent lane into which the vehicle would turn in executing the lane change maneuver; and controlling via the processor, longitudinal movement of the vehicle such that the vehicle can effectively execute the lane change maneuver into the adjacent lane;

wherein the longitudinal movement of the vehicle is automatically controlled by the processor of the vehicle as the driver manually performs lateral movement of the vehicle via engagement of a steering wheel of the vehicle by the driver during the lane change maneuver;

wherein the step of determining the target zone comprises determining, via the processor, the target zone from a plurality of target zone candidates of sufficient size to allow the vehicle to travel therethrough without contacting other vehicles or other objects;

wherein the step of determining when the driver of the vehicle is initiating the lane change maneuver for the vehicle into the adjacent lane comprises both obtaining, via the sensor data, a first indication of the lane change maneuver; and obtaining via the sensor data, a second indication of the lane change maneuver that is subsequent to the first indication;

wherein the step of determining the target zone comprises determining, via the processor after the first indication and before the second indication, an initial target zone prediction from the plurality of target zone candidates for the lane change maneuver; and determining, via the processor after the second indication, an updated target zone prediction from the plurality of target zone candidates for the lane change maneuver;

wherein the step of controlling the longitudinal movement comprises controlling, via the processor, the longitudinal movement of the vehicle after the first indication and before the second indication by adjusting a longitudinal speed of the vehicle such that the vehicle is on path to effectively execute the lane change maneuver into the adjacent lane via the initial target zone prediction; and controlling, via the processor, the longitudinal movement of the vehicle after the second indication by adjusting the longitudinal speed of the vehicle such that the vehicle is on path to effectively execute the lane change maneuver into the adjacent lane via the updated target zone prediction;

wherein the first indication is based on the driver engaging a turn signal of the vehicle and the second indication is made based on the driver engaging the steering wheel of the vehicle;

wherein the initial target zone prediction is made via the processor, after the first indication and before the second indication, to be an initial selection from the plurality of target zone candidates as a closest one of the plurality of target zone candidates to the vehicle in terms of a time for travel thereto by the vehicle; and the updated target zone prediction is made via the processor after the second indication to be an updated selection from the plurality of target zone candidates as a closest one of the plurality of target zone candidates to the vehicle in terms of a distance for travel thereto by the vehicle; and wherein the time for travel by the vehicle to a particular one of the plurality of target zone candidates is determined via the processor in connection with the following equation:

$$t_1 = \frac{-Vx1 + \sqrt{Vx1^2 - 2 * DclRate * \Delta x_1}}{DclRate},$$

in which "$t_1$" represents the time to reach a particular target zone candidate, "$V_{x1}$" represents a current velocity of a target vehicle or object at the particular target zone candidate; "DclRate" represents a calibratable parameter based on an expected longitudinal deceleration rate response of the vehicle for the lane change maneuver, "$\Delta x_1$" represents the distance between the vehicle and the particular target zone candidate.

2. The method of claim 1, further comprising:

determining, for each of the plurality of target zone candidates, whether the target zone candidate is of sufficient size based on a position and movement of the vehicle and the other vehicles or other objects as obtained via the sensor data, along with pre-calibrated requirements as to a driver-selected follow distance for adaptive cruise control with respect to those of the other vehicles and other objects that are in front of the vehicle as well as a buffer with respect to other of the other vehicles and other objects that are behind the vehicle.

3. The method of claim 1, wherein the target zone is selected via the processor such that the target zone comprises a particular one of the plurality of target zone candidates that is closest to the vehicle in terms of a distance from the vehicle to the target zone, a time from the vehicle to the target zone, or both.

4. The method of claim 3, wherein the target zone is selected by the processor such that the target zone comprises the particular one of the plurality of target zone candidates that is closest to the vehicle in terms of both the distance from the vehicle to the target zone and the time from the vehicle to the target zone.

5. The method of claim 1, wherein the distance for travel by the vehicle to the particular one of the plurality of target zone candidates is determined via the processor based on:

a distance from a front of the vehicle to a rear edge of the particular target zone candidate, when the particular target zone candidate is behind the vehicle; and a distance from a rear of the vehicle to a front edge of the particular target zone candidate, when the particular target zone candidate is in front of the vehicle.

6. The method of claim 5, further comprising:

determining, via the processor using the sensor data; whether a trailer is attached to the vehicle;

when it is determined that no trailer is attached to the vehicle, then determining, via the processor, the initial target zone prediction and the updated target zone prediction based on an entirety of the plurality of target zone candidates, regardless of whether the target zone candidates are in front of the vehicle or behind the vehicle; and when it is instead determined that a trailer is attached to the vehicle, then determining, via the processor, the initial target zone prediction and the updated target zone prediction instead based on only a subset of the plurality of target zone candidates that are in front of the vehicle.

7. A system comprising:

one or more sensors of a vehicle that are configured to obtain sensor data, including as to engagement of a turn signal and a steering wheel of the vehicle by a driver of the vehicle; and a processor that is coupled to the one or more sensors and that is configured to at least facilitate:

determining, using the sensor data, when a driver of the vehicle is initiating a lane change maneuver for the vehicle into an adjacent lane, including a first indication of the lane change maneuver based on the engagement of the turn signal by the driver and a second indication of the lane change maneuver based on the engagement of the steering wheel by the driver;

determining, using the sensor data, including as to the engagement of both the turn signal and the steering wheel by the driver, a target zone for the lane change maneuver, the target zone comprising a region of the adjacent lane into which the vehicle would turn in executing the lane change maneuver, and wherein the target zone is determined from a plurality of target zone candidates of sufficient size to allow the vehicle to travel therethrough without contacting other vehicles or other objects; and automatically controlling longitudinal movement of the vehicle as the driver manually performs lateral movement of the vehicle via engagement of the steering wheel of the vehicle by the driver during the lane change maneuver, such that the vehicle can effectively execute the lane change maneuver into the adjacent lane without contacting the other vehicles or other objects;

wherein the processor is further configured to at least facilitate:

determining, after the first indication of the lane change maneuver and before the second indication of the lane change maneuver, an initial target zone prediction from the plurality of target zone candidates for the lane change maneuver;

determining, after the second indication of the lane change maneuver, an updated target zone prediction from the plurality of target zone candidates for the lane change maneuver;

controlling the longitudinal movement of the vehicle after the first indication of the lane change maneuver and before the second indication of the lane change maneuver by adjusting a longitudinal speed of the vehicle such that the vehicle is on path to effectively execute the lane change maneuver into the adjacent lane via the initial target zone prediction;

controlling the longitudinal movement of the vehicle after the second indication of the lane change maneuver by adjusting the longitudinal speed of the vehicle such that the vehicle is on path to effectively execute the lane change maneuver into the adjacent lane via the updated target zone prediction;

determining the initial target zone prediction after the first indication and before the second indication, to be an initial selection from the plurality of target zone candidates as a closest one of the plurality of target zone candidates to the vehicle in terms of a time for travel thereto by the vehicle; and determining the updated target zone prediction after the second indication, to be an updated selection from the plurality of target zone candidates as a closest one of the plurality of target zone candidates to the vehicle in terms of a distance for travel thereto by the vehicle; and determining the time for travel by the vehicle to a particular one of the plurality of target zone candidates in connection with the following equation:

$$t_1 = \frac{-Vx1 + \sqrt{Vx1^2 - 2 * DclRate * \Delta x_1}}{DclRate},$$

in which "$t_1$" represents the time to reach a particular target zone candidate, "$V_{x1}$" represents a current velocity of a target vehicle or object at the particular target zone candidate; "DclRate" represents a calibratable parameter based on an expected longitudinal deceleration rate response of the for the lane change maneuver, "$\Delta x_1$" represents the distance between the vehicle and the particular target zone candidate.

8. The system of claim 7, wherein the processor is further configured to at least facilitate determining, for each of the plurality of target zone candidates, whether the target zone candidate is of sufficient size based on a position and movement of the vehicle and the other vehicles or other objects as obtained via the sensor data, along with pre-calibrated requirements as to a driver-selected follow distance for adaptive cruise control with respect to those of the other vehicles and other objects that are in front of the vehicle as well as a buffer with respect to other of the other vehicles and other objects that are behind the vehicle.

9. The system of claim 7, wherein the processor is further configured to at least facilitate selecting the target zone such that the target zone comprises a particular one of the plurality of target zone candidates that is closest to the vehicle in terms of a distance from the vehicle to the target zone, a time from the vehicle to the target zone, or both.

10. The system of claim 9, wherein the processor is further configured to at least facilitate selecting the target zone such that the target zone comprises the particular one of the plurality of target zone candidates that is closest to the vehicle in terms of both the distance from the vehicle to the target zone and the time from the vehicle to the target zone.

11. The system of claim 7, wherein the processor is further configured to at least facilitate determining the distance for travel by the vehicle to the particular one of the plurality of target zone candidates based on:

a distance from a front of the vehicle to a rear edge of the particular target zone candidate, when the particular target zone candidate is behind the vehicle; and a distance from a rear of the vehicle to a front edge of the particular target zone candidate, when the particular target zone candidate is in front of the vehicle.

12. The system of claim 11, wherein the processor is further configured to at least facilitate:

determining, using the sensor data, whether a trailer is attached to the vehicle;

when it is determined that no trailer is attached to the vehicle, then determining the initial target zone prediction and the updated target zone prediction based on an entirety of the plurality of target zone candidates, regardless of whether the target zone candidates are in front of the vehicle or behind the vehicle; and when it is instead determined that a trailer is attached to the vehicle, then determining the initial target zone prediction and the updated target zone prediction instead based on only a subset of the plurality of target zone candidates that are in front of the vehicle.

13. A vehicle comprises:

a body;

a drive system configured to move the body;

a braking system configured to control braking for the body;

a steering system configured to control steering for the body, the steering system including a turn signal and a steering wheel; and a control system comprising:

one or more sensors that are configured to obtain sensor data, including as to engagement of the turn signal and the steering wheel by a driver of the vehicle; and a processor that is coupled to the one or more sensors and that is configured to at least facilitate:

determining, using the sensor data, when a driver of the vehicle is initiating a lane change maneuver for the vehicle into an adjacent lane, including a first indication of the lane change maneuver based on the engagement of the turn signal by the driver and a second indication of the lane change maneuver based on the engagement of the steering wheel by the driver;

determining, using the sensor data, a plurality of target zone candidates for the lane change maneuver, each of the plurality of target zone candidates comprising a region of the adjacent lane into which the vehicle would turn in executing the lane change maneuver wherein each of the plurality of target zone candidates of is sufficient size to allow the vehicle to travel therethrough without contacting other vehicles or other objects, and wherein the processor determines a selected target zone from the plurality of target zone candidates as follows:

determining, using the sensor data, after the first indication of the lane change maneuver and before the second indication of the lane change maneuver, an initial target zone prediction for the selected target zone from the plurality of target zone candidates for the lane change maneuver as a closest one of the plurality of target zone candidates to the vehicle in terms of a time for travel thereto by the vehicle;

determining, after the second indication of the lane change maneuver, an updated target zone prediction of the selected target zone from the plurality of target zone candidates for the lane change maneuver as a closest one of the plurality of target zone candidates to the vehicle in terms of a distance for travel thereto by the vehicle; and automatically controlling longitudinal movement of the vehicle based initially on the initial target zone prediction and subsequently on the updated target zone prediction as the driver manually performs lateral movement of the vehicle via engagement of the steering wheel of the vehicle by the driver during the lane change maneuver, such that the vehicle can effectively execute the lane change maneuver into the adjacent lane without contacting the other vehicles or other objects, including based on whether the target zone candidate is of sufficient size based on a position and movement of the vehicle and the other vehicles or other objects as obtained via the sensor data, along with pre-calibrated requirements as to a driver-selected follow distance for adaptive cruise control with respect to those of the other vehicles and other objects that are in front of the vehicle as well as a buffer with respect to other of the other vehicles and other objects that are behind the vehicle, including by:

controlling the longitudinal movement of the vehicle after the first indication of the lane change maneuver and before the second indication of the lane change maneuver by adjusting a longitudinal speed of the vehicle such that the vehicle is on path to effectively execute the lane change maneuver into the adjacent lane via the initial target zone prediction; and controlling the longitudinal movement of the vehicle after the second indication of the lane change maneuver by adjusting the longitudinal speed of the vehicle such that the vehicle is on path to effectively execute the lane change maneuver into the adjacent lane via the updated target zone prediction; and determining the time for travel by the vehicle to a particular one of the plurality of target zone candidates in connection with the following equation:

$$t_1 = \frac{-Vx1 + \sqrt{Vx1^2 - 2*DclRate*\Delta x_1}}{DclRate},$$

in which "$t_1$" represents the time to reach a particular target zone candidate, "$V_{x1}$" represents a current velocity of a target vehicle or object at the particular target zone candidate; "DclRate" represents a calibratable parameter based on an expected longitudinal deceleration rate response of the for the lane change maneuver, "$\Delta x_1$" represents the distance between the vehicle and the particular target zone candidate.

14. The vehicle of claim 13, wherein the processor is further configured to at least facilitate determining, for each of the plurality of target zone candidates, whether the target zone candidate is of sufficient size based on a position and movement of the vehicle and the other vehicles or other objects as obtained via the sensor data, along with pre-calibrated requirements as to a driver-selected follow distance for adaptive cruise control with respect to those of the other vehicles and other objects that are in front of the vehicle as well as a buffer with respect to other of the other vehicles and other objects that are behind the vehicle.

15. The vehicle of claim 14, wherein the processor is further configured to at least facilitate selecting the target zone such that the target zone comprises the particular one of the plurality of target zone candidates that is closest to the vehicle in terms of both the distance from the vehicle to the target zone and the time from the vehicle to the target zone.

16. The vehicle of claim 13, wherein the processor is further configured to at least facilitate selecting the target zone such that the target zone comprises a particular one of the plurality of target zone candidates that is closest to the vehicle in terms of a distance from the vehicle to the target zone, a time from the vehicle to the target zone, or both.

17. The vehicle of claim 13, wherein the processor is further configured to at least facilitate determining the distance for travel by the vehicle to the particular one of the plurality of target zone candidates based on:

a distance from a front of the vehicle to a rear edge of the particular target zone candidate, when the particular target zone candidate is behind the vehicle; and a distance from a rear of the vehicle to a front edge of the particular target zone candidate, when the particular target zone candidate is in front of the vehicle.

18. The vehicle of claim 13, wherein the processor is further configured to at least facilitate:

determining, using the sensor data, whether a trailer is attached to the vehicle; and when it is determined that no trailer is attached to the vehicle, then determining the initial target zone prediction and the updated target zone prediction based on an entirety of the plurality of target zone candidates, regardless of whether the target zone candidates are in front of the vehicle or behind the vehicle.

19. The vehicle of claim 18, wherein the processor is further configured to at least facilitate:

when it is instead determined that a trailer is attached to the vehicle, then determining the initial target zone prediction and the updated target zone prediction instead based on only a subset of the plurality of target zone candidates that are in front of the vehicle.

20. The vehicle of claim 13, wherein the vehicle comprises an automobile.

* * * * *